(12) United States Patent
Sarkar

(10) Patent No.: US 9,378,564 B2
(45) Date of Patent: Jun. 28, 2016

(54) METHODS FOR COLOR CORRECTING DIGITAL IMAGES AND DEVICES THEREOF

(71) Applicant: ColorModules Inc., Stamford, CT (US)

(72) Inventor: Abhijit Sarkar, Stamford, CT (US)

(73) Assignee: ColorModules Inc., Stamford, CT (US)

( * ) Notice: Subject to any disclaimer, the term of this patent is extended or adjusted under 35 U.S.C. 154(b) by 0 days.

(21) Appl. No.: 14/195,517

(22) Filed: Mar. 3, 2014

(65) Prior Publication Data

US 2014/0247984 A1  Sep. 4, 2014

Related U.S. Application Data

(60) Provisional application No. 61/771,364, filed on Mar. 1, 2013.

(51) Int. Cl.
*G06K 9/00* (2006.01)
*G06T 11/00* (2006.01)

(52) U.S. Cl.
CPC ................... *G06T 11/001* (2013.01)

(58) Field of Classification Search
None
See application file for complete search history.

(56) References Cited

U.S. PATENT DOCUMENTS

| 6,292,574 | B1* | 9/2001 | Schildkraut et al. | 382/117 |
|---|---|---|---|---|
| 6,728,401 | B1* | 4/2004 | Hardeberg | 382/167 |
| 2002/0106112 | A1* | 8/2002 | Chen et al. | 382/117 |
| 2002/0114495 | A1* | 8/2002 | Chen et al. | 382/117 |
| 2002/0176610 | A1* | 11/2002 | Okazaki et al. | 382/118 |
| 2003/0161506 | A1* | 8/2003 | Velazquez et al. | 382/118 |
| 2004/0037460 | A1* | 2/2004 | Luo et al. | 382/165 |
| 2005/0196067 | A1* | 9/2005 | Gallagher et al. | 382/275 |
| 2007/0110284 | A1* | 5/2007 | Rieul et al. | 382/117 |
| 2009/0103784 | A1* | 4/2009 | Forutanpour | 382/117 |
| 2009/0169101 | A1* | 7/2009 | Mitarai et al. | 382/167 |

* cited by examiner

*Primary Examiner* — Andrae S Allison
(74) *Attorney, Agent, or Firm* — LeClairRyan, a Professional Corporation

(57) ABSTRACT

A method, non-transitory medium and color correction computing device that identifies an area of interest in a digital image comprising a plurality of pixels. A white point in the identified area of interest is determined. One or more corrected colorimetric data points are determined for each of the plurality of pixels in the identified area of interest based on the determined white point. One or more output colors in the digital image are corrected using the determined one or more corrected colorimetric data points.

21 Claims, 9 Drawing Sheets

METHODS FOR COLOR CORRECTING DIGITAL IMAGES AND DEVICES THEREOF

This application claims the benefit of U.S. Provisional Application No. 61/771,364, filed Mar. 1, 2013, which is hereby incorporated by reference in its entirety.

FIELD

This technology relates to automatic color correction of digital images and, in particular, methods, non-transitory computer readable medium and devices for extracting true colors from digital images independent of illuminant, background, and camera capture settings.

BACKGROUND

Imaging applications may utilize various color correction techniques, such as white balance or lighting compensation techniques, to enhance or sharpen digital images. For example, the digital image may be color corrected to adjust for both camera and lighting conditions. Current color correction techniques, however, rarely maintain colorimetric accuracy.

Most imaging applications apply color correction techniques to achieve pleasing results according to user preferences. Further, many automatic color correction methods are based on either a "white world" assumption or a "gray world" assumption. The former assumes any given image has at least some areas that are white, while the latter presumes adding all colors in an image should average to gray. These assumptions are inadequate for extracting true colors from a digital image. In particular, for facial images, the gray world assumption is often invalid as the image is dominated by flesh tone.

Additionally, existing color processing algorithms fail to take into account the relationships among the various colors within an image. These algorithms often attempt to modify individual colors according to user preferences. Sometimes the color enhancement algorithms tend to ignore the perceptual aspects of color, in other words, how the human visual system perceives color in terms of lightness, chroma and hue. Any algorithm that operates directly on the raw digital data (e.g. red, green, and blue channel data) from an image, without considering the above-mentioned perceptual attributes, is characterized by this trait. Applying such a method renders it impossible to predict the original facial colors under a reference lighting condition. As such, many existing color correction techniques do not provide for the reproduction of the actual colors of an object in a digital image.

Existing color correction techniques that attempt to reproduce colorimetrically accurate images require the use of a reference dataset such as a color target or image metadata. Use of such reference datasets requires additional action on the part of the user and, thus, is rather inconvenient for typical consumer applications.

SUMMARY

A method for color correcting a digital image comprising identifying, by a color correction computing device, one or more facial areas in an identified area of interest in a digital image comprising a plurality of pixels. A white point in the identified area of interest is determined. One or more corrected colorimetric data points for each of the plurality of pixels in the identified area of interest are determined based on the determined white point. One or more output colors in the are corrected using the determined one or more corrected colorimetric data points.

A non-transitory computer readable medium having stored thereon instructions for color correction a digital image comprising machine executable code which when executed by a processor, causes the processor to perform steps including identifying one or more facial areas in an identified area of interest in a digital image comprising a plurality of pixels. A white point in the identified area of interest is determined. One or more corrected colorimetric data points for each of the plurality of pixels in the identified area of interest are determined based on the determined white point. One or more output colors in the are corrected using the determined one or more corrected colorimetric data points.

A color correction computing device includes a processor coupled to a memory and configured to execute programmed instructions stored in the memory including identifying one or more facial areas in an identified area of interest in a digital image comprising a plurality of pixels. A white point in the identified area of interest is determined. One or more corrected colorimetric data points for each of the plurality of pixels in the identified area of interest are determined based on the determined white point. One or more output colors in the are corrected using the determined one or more corrected colorimetric data points.

This technology provides a number of advantages including providing methods, non-transitory computer readable medium, and a color correction computing device for obtaining colorimetrically accurate (actual or real) colors of an object from a digital image of the object captured by a digital camera with known characteristics, but under unknown lighting and diverse background conditions.

In one example, the object is a face and this exemplary technology acquires accurate color extraction of true hair, eye, skin and lip colors. This technology advantageously does not require the use of a color target or chart, or any other similar object. Further, this technology does not rely on additional information about the capture settings, available for example through image metadata.

This exemplary technology may use perceptual colorimetric data from the white area in the human eye to estimate prevalent lighting conditions. The luminance of the corrected eye white is scaled to a target value to compensate for the camera exposure. Lightness, chroma and hue of the eye white are mapped to specific reference values.

The colorimetric data for the white area of the eye is then used to correct the facial colors as if the image was captured under soft daylight. The color correction advantageously preserves the relationships between the lightness, chroma and hue for various facial features, such as the skin, lips and hair, by applying the same linear transformation to all pixels in the digital image. This exemplary technology allows the background and other parts of the image outside the facial area to be completely saturated or completely de-saturated as the output colors in these areas are irrelevant.

This exemplary technology further provides for the computation of the dominant colors of the hair, eye, skin, and lip areas. This computation uses lightness, chroma and hue of each pixels expressed in a perceptual color space. For each of the four areas, dominant colors are computed by ignoring pixels with extreme lightness and hue values.

This exemplary technology further provides an improved method to increase the accuracy in the hair area identification. Perceptual colorimetric data from the hair and surrounding regions is used to create a free-form mask for the hair area, which is then used to extract hair color. This exemplary technology advantageously avoids standard edge-detection methods and is less prone to false edge detection due to the background, skin imperfections or hair locks falling on the forehead.

Both color correction and extraction methods exclusively use perceptual dimensions of color, i.e., lightness, chroma and hue, and not the raw digital red, green, blue channel values. Further, this exemplary technology advantageously does not require any color target, nor does it need access to image metadata. These offer huge advantages for consumer applications.

DETAILED DESCRIPTION

Figure 1:
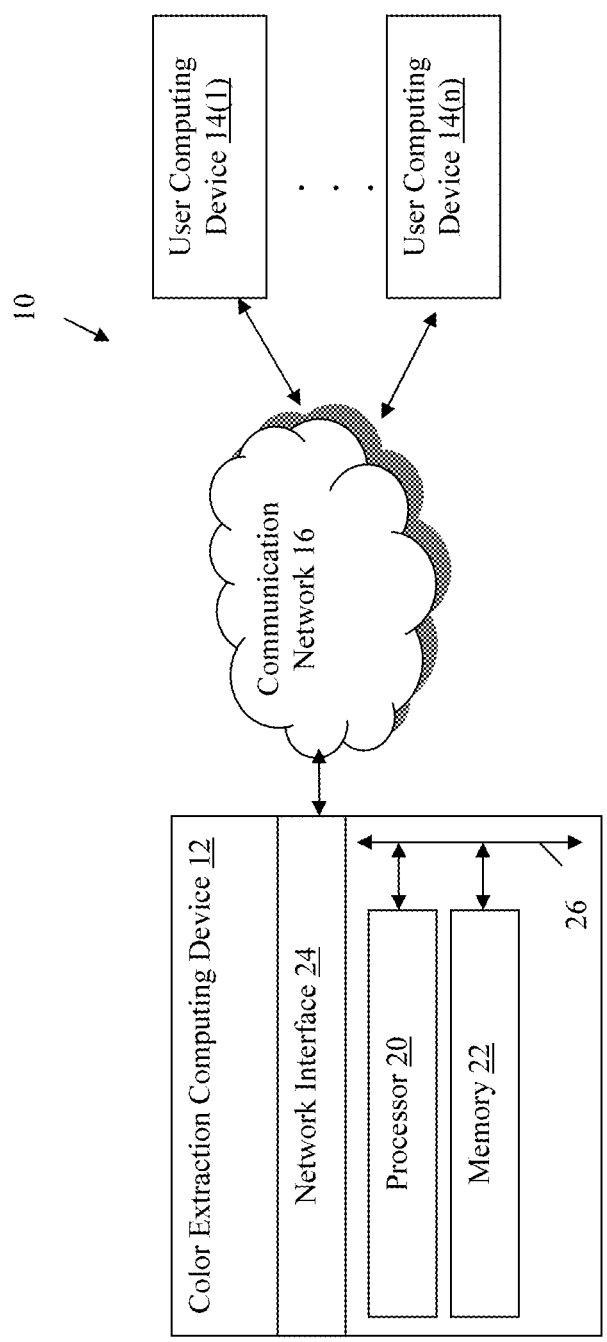
FIG. 1 is a block diagram of an environment with an exemplary color correction computing device coupled to a plurality of user computing devices.

An exemplary environment 10 including a color correction computing device 12 coupled to a plurality of user computing devices 14(1)-14(n) by communication network(s) 16 is illustrated in FIG. 1, although this environment 10 can include other types and numbers of devices, components, and/or elements in a variety of other topologies and deployments. While not shown, the environment 10 also may include additional components which are well known to those of ordinary skill in the art and thus will not be described here. This technology provides a number of advantages including providing methods, non-transitory computer readable medium, and a color correction computing device for obtaining colorimetrically accurate (actual or real) colors of an object from a digital image of the object captured by a digital camera with known characteristics, but under unknown lighting and diverse background conditions as illustrated and described with reference to the examples herein.

The color correction computing device 12 includes a processor 20, a memory 22, and a communication interface 24, which are coupled together by a bus 26, or other link, although the color correction computing device 12 may comprise other types and numbers of elements in other configurations. The color correction computing device 12 facilitates determining the true (colorimetrically accurate) colors of various facial features from a digital image of a person's face as illustrated and described with the examples herein, although the color correction computing device 12 may perform other types and numbers of functions.

The processor 20 of the color correction computing device 12 executes a program of stored instructions for one or more aspects of the present technology as described and illustrated by way of the examples herein. Other types and numbers of processing devices and configurable hardware logic could be used and the processor 20 in the color correction computing device 12 could execute other numbers and types of programmed instructions.

The memory 22 of the color correction computing device 12 stores the programmed instructions for one or more aspects of the present technology, as described and illustrated herein, although some or all of the programmed could be stored and/or executed elsewhere. A variety of different types of memory storage devices, such as a random access memory (RAM), read only memory (ROM), floppy disk, hard disk, CD-ROM, DVD-ROM, or other computer readable medium which is read from and written to by a magnetic, optical, or other reading and writing system that is coupled to the processor 20, can be used for the memory 22.

The communication interface 24 in the color correction computing device 12 is used to operatively couple and communicate between the color correction computing device 12 and one or more of the plurality of user computing devices 14(1)-14(n) via the communication network(s) 16, although other types and numbers of connections or configurations can also be used. By way of example only, the communication network(s) 16 could use TCP/IP over Ethernet and industry-standard protocols and can include one or more local area networks or wide area networks, for example.

Figure 2:
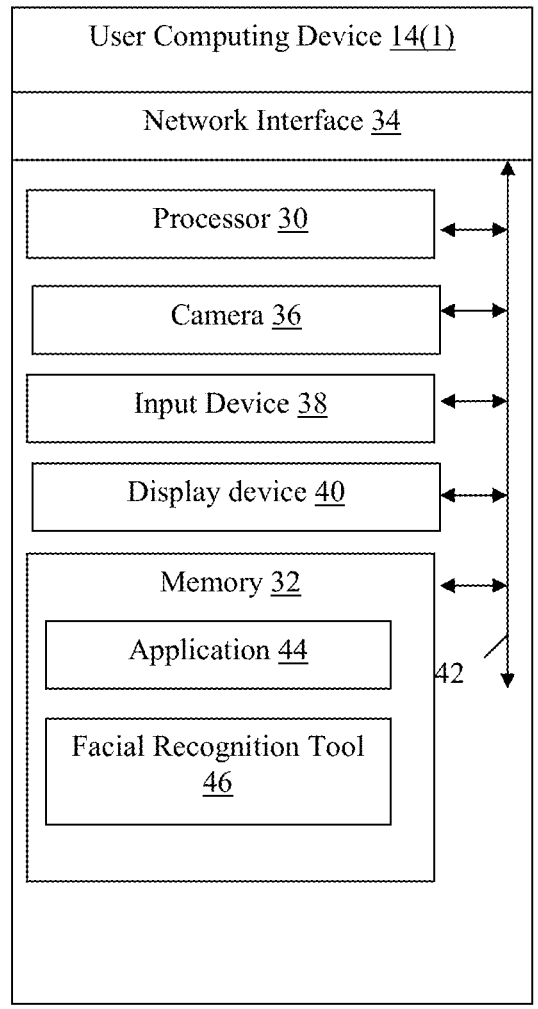
FIG. 2 is a block diagram of an exemplary user computing device.

Referring now to FIG. 2, an exemplary user computing device 14(1) is illustrated. Each of the plurality of user computing devices 14(1)-14(n) illustrated in FIG. 1 may include the elements illustrated and described with respect to user computing device 14(1), although the user computing devices 14(1)-14(n) may include other elements in other configurations.

The user computing device 14(1) includes a processor 30, a memory 32, a communication interface 34, a camera 36, an input device 38, and a display device 40, which are coupled together by a bus 42 or other link. The user computing device 14(1) can also have other numbers and types of systems, devices, components, and elements in other configurations and locations. A user can utilize the user computing device 14(1) to obtain and submit digital images to the color correction computing device 12, as well as to exchange other information with color correction computing device and/or perform other types and numbers of functions.

The processor 30 in the user computing device 14(1) executes a program of stored instructions for one or more aspects of the present technology as described and illustrated by way of the examples herein. Other types and numbers of processing devices and configurable hardware logic could be used and the processor 30 in the user computing device 14(1) could execute other numbers and types of programmed instructions.

The memory 32 in the user computing device 14(1) stores the programmed instructions for one or more aspects of the present technology, as described and illustrated herein, although some or all of the programmed instructions could be stored and/or executed elsewhere. The memory 32 optionally stores programmed instructions for a Web browser for communicating with the communication interface 34 to operatively exchange content with the color correction computing device 12. Additionally, the memory 32 optionally stores programmed instructions for an application 44 that assists the user in interacting with the color correction computing device 12 to capture a digital image and send information to and receive information from the color correction computing device 12. A variety of different types of memory storage devices, such as a random access memory (RAM), read only memory (ROM), floppy disk, hard disk, CD-ROM, DVD-ROM, or other computer readable medium which is read from and written to by a magnetic, optical, or other reading and writing system that is coupled to the processor 30, can be used for the memory 32.

The communication interface 34 in the user computing device 14(1) is used to operatively couple and communicate between the user computing device 14(1) and the color correction computing device 12 via the communication network(s) 16, although other types and numbers of connections or configurations can also be used. By way of example only, the communication network(s) 16 could use TCP/IP over Ethernet and industry-standard protocols and can include one or more local area networks or wide area networks, for example.

Camera 36 of the user computing device 14(1) allows for capture of a digital image of a user's face, although other images may be obtained. In this example, the camera 36 includes known sensor characteristics, although camera capture settings, such as by way of example only, exposure and white balance may be adjusted manually or programmatically, with final settings being unknown to the methods described herein. Preferably, the exposure/white balance settings for camera 36 are not set to automatic mode during capture of the image.

The input device 38 in the user computing device 14(1) is used to enable a user to interact with the user computing device 14(1), such as to input data or to configure, program, or operate the user computing device 14(1) by way of example only. Input devices may include a keyboard, computer mouse, or touchscreen, for example, although other types and numbers of input devices could also be used. The display device 40 in the user computing device 14(1) is used to enable a user to view data and information output or provided by the user computing device 14(1). Display device 40 may include a computer monitor or a touchscreen, although other types and numbers of display devices could also be used.

Although examples of the color correction computing device 12 and the user computing devices 14(1)-14(n), which are coupled together via the communication network(s) 16, are described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. The examples may also be implemented on computer device(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, or combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
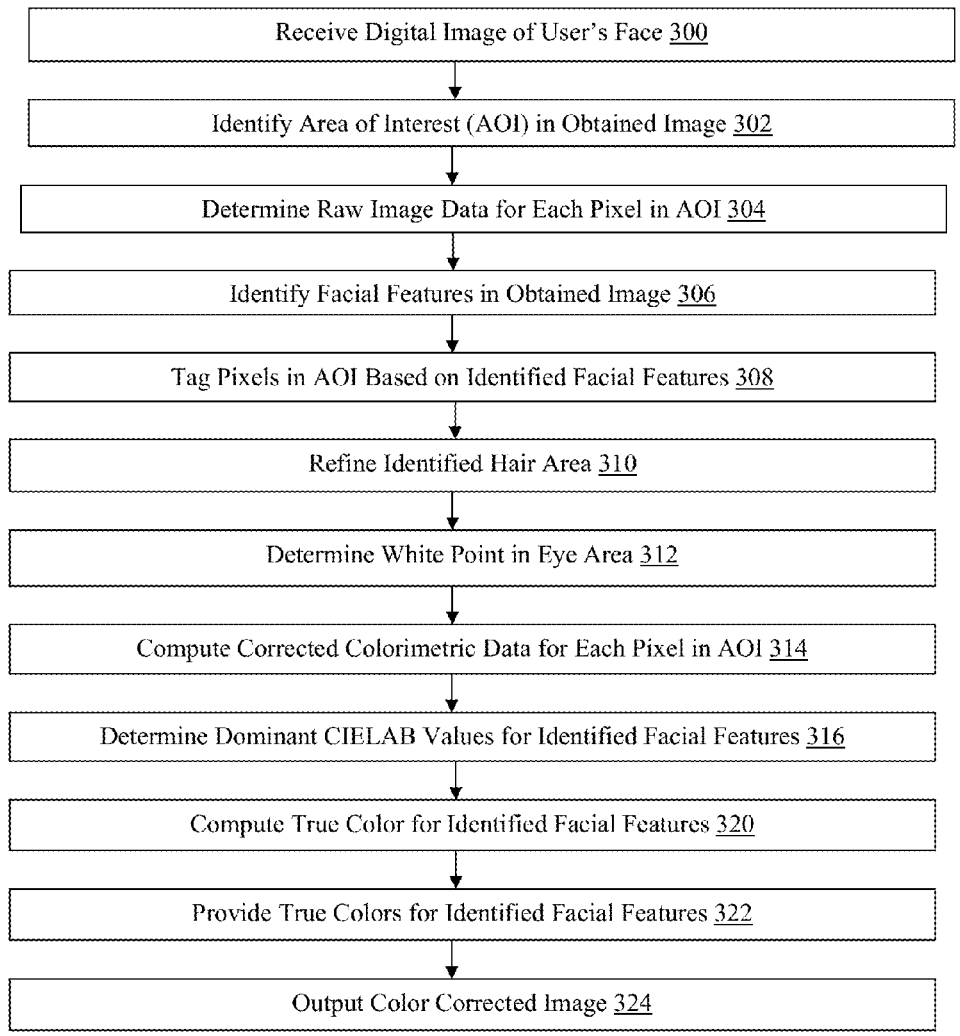
FIG. 3 is flowchart of an exemplary method for determining the true colors of a digital image.

Exemplary methods for determining the true colors of various facial features from a digital image of a person's face will be now described herein with reference to FIGS. 1-9. Referring more specifically to FIG. 3, in step 300 the color correction computing device 12 receives a digital image of a user's face captured by user computing device 14(1) through camera 36, although the color correction computing device 12 may obtain other types of images captured on other cameras from other devices. The camera 36 of the user computing device 14(1) may have the automatic tuning of exposure and white balance turned off to control these imaging aspects of the capture, although other capture settings may be used. Generic camera characteristics may be used to implement the method, by way of example only, on a website, irrespective of the specific camera used in the capture process.

In this example, application 44 includes a facial recognition tool 46 comprising a module of programmed instructions stored on the user computing device 14(1) to aid in the capture process. The facial recognition tool 46 guides the user to position her face at an appropriate distance for image capture. The facial recognition tool 46 further ensures the face is in focus and that the user's facial features are all identifiable. This process ensures that the digital image of the user's face has approximately the same dimensions on every capture. As a result, fixed proportions can be used in identifying various regions in the face, for example the hair, eye, skin and lip areas. Although an exemplary capture process has been described, it is to be understood that other capture settings and other applications that assist in obtaining the digital image may be utilized.

In step 302, the color correction computing device 12 identifies an area of interest (AOI) in the obtained digital image which tightly encompasses the user's whole face, although other AOI's may be utilized by the present method. The color correction computing device 12 may determine the AOI based on eye and mouth coordinates in the received digital image determined by the facial recognition tool 46, although the color correction computing device 12 may use other methods to identify the AOI. By way of example, the color correction computing device 12 may determine the AOI based on the eye and mouth coordinates and fixed proportions based on the image capture settings employed by the facial recognition tool 46. The color correction computing device 12 may provide instructions to the user computing device 14(1) for the user to position her face at a certain distance from the user computing device 14(1) for image capture.

In step 304, the color correction computing device 12 analyzes the received image to determine and form a collection of data for each pixel in the AOI. The collection of data includes the relevant colorimetric data, including the raw image data (input RGB) for each pixel, although other data may be obtained for each pixel in the AOI.

Next, in step 306, the color correction computing device 12 identifies, by way of example only, the hair, eye, skin, and lip areas within the AOI, although other types and numbers of features in the AOI may be identified. Alternatively, the facial recognition tool 46 may be used to identify the various facial features and the color correction computing device 12 receives information related to the identified areas from the user computing device 14(1), although other tools and methods for identifying relevant facial features may be used.

In step 308, the color correction computing device 12 tags each pixel in the AOI to indicate the facial area that the pixel is determined to be associated with in step 306, although the mobile computing device may tag other relevant data with respect to each of the pixels. The tags indicate whether the pixel is associated with, by way of example only, the user's hair, eyes, skin, and lip areas. Further, a tag of zero indicates that the pixel does not belong to any of the identified facial areas, although other tags may be utilized to identify other numbers and types of pixels in the digital image.

In step 310, the color correction computing device 12 may optionally refine the hair area identified in the previous step, although the color correction computing device 12 may provide additional identification refining methods for other determined facial areas. Compared to other facial features, the hair is more difficult to detect since the color and shape can vary drastically from one person to another, and even one person can have multiple shades of hair color. Further, the background can adversely affect hair detection more than other facial area colors.

Figure 4:
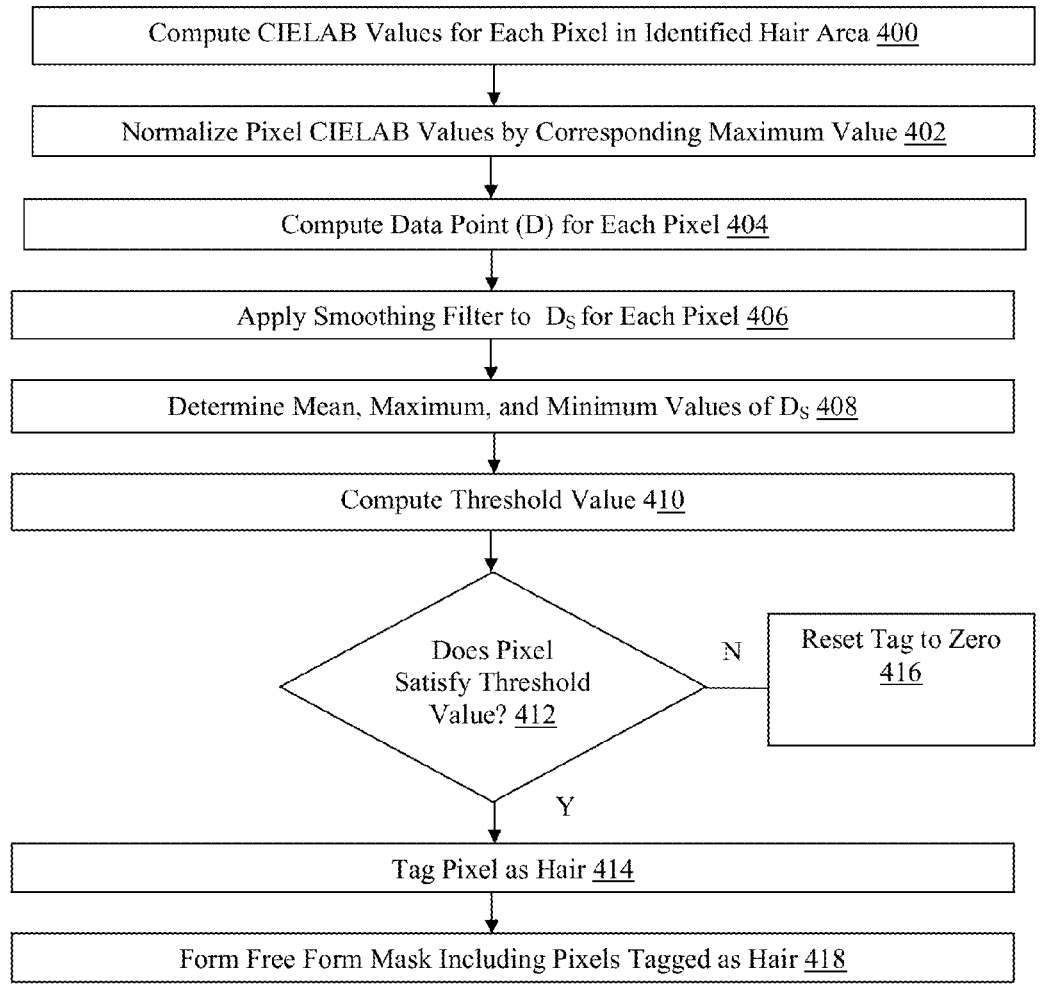
FIG. 4 is a flowchart of an exemplary method of refining a hair area in a digital image.

An exemplary method of refining the identified hair area is illustrated in FIG. 4. In step 400, the color correction computing device 12 computes CIELAB lightness (L*), chroma (C*) and hue (h*) values for each pixel in the tentatively identified hair area using known techniques, which includes all pixels in the digital image tagged as hair, although the color extracting computing device 14 may compute other values associated with the tentatively defined hair area.

In step 402, the color correction computing device 12 normalizes the L*, C*, and h* values for each pixel in the entire area tentatively defined as the hair area by dividing each pixel value by the respective maximum values in the defined area, although the L*, C*, and h* values for each pixel in the entire area tentatively defined as the hair area may be normalized using other methods. Next, in step 404, the color correction computing device 12 forms a data point (D) for each pixel using the following heuristic equation, although other equations may be utilized:

$$D=2*L-C$$

In step 406, the color correction computing device 12 applies a smoothing filter to the data points D to reduce noise in the image data and obtain data point $D_S$ for each pixel, although other methods of reducing noise in data point D may be used. Smoothing filters known in the art of image processing may be utilized. In step 408, the color correction computing device 12 calculates the mean ($D_{S-mean}$), maximum ($D_{S-max}$), and minimum ($D_{S-min}$) values of $D_S$, although other data sets related to $D_S$ may be calculated. Next, in step 410, the color correction computing device 12 computes a threshold value (T) from the mean, maximum and minimum values of the smoothed data ($D_S$). In this example, the threshold value (T) is computed based on the following heuristic equation, although other equations may be used:

$$T=0.9447*D_{S-mean}-0.0309*D_{S-max}+0.3287*D_{S-min}$$

In step 412, the color correction computing device 12 determines whether the threshold value (T) is satisfied for each pixel. In particular, the color correction computing device 12 determines whether or not a pixel should be tagged as belonging to the hair region. If, in step 412, T is less than 0.5, each pixel with a $D_S$ value less than T is tagged as belonging to the hair area then the Yes branch is taken to step 414 the pixel is tagged as belonging to the hair area. Similarly, if T is greater than or equal to 0.5, each pixel with a $D_S$ value greater than or equal to T then the Yes branch is taken to step 414 and the pixel is tagged as belonging to the hair area. If either of the conditions is not met in step 412, then the No branch is taken to step 416 where the pixel tag is reset to zero, indicating the pixel does not belong to the hair area.

Figure 5:
FIG. 5 is a screen shot of the results of the exemplary method illustrated in the flowchart of FIG. 4.

In step 418, a free-form mask is then formed including all of the pixels tagged as part of the user's hair area in step 414, although other methods of grouping the pixels may be utilized. Results from the identified hair detection algorithm are illustrated in FIG. 5. The method works for different hair colors and different backgrounds. Although an exemplary method of refining the identified hair area in a digital image, it is to be understood that other methods and tools for refining other numbers and types of identified facial areas may be used in conjunction with the present invention.

Figure 6:
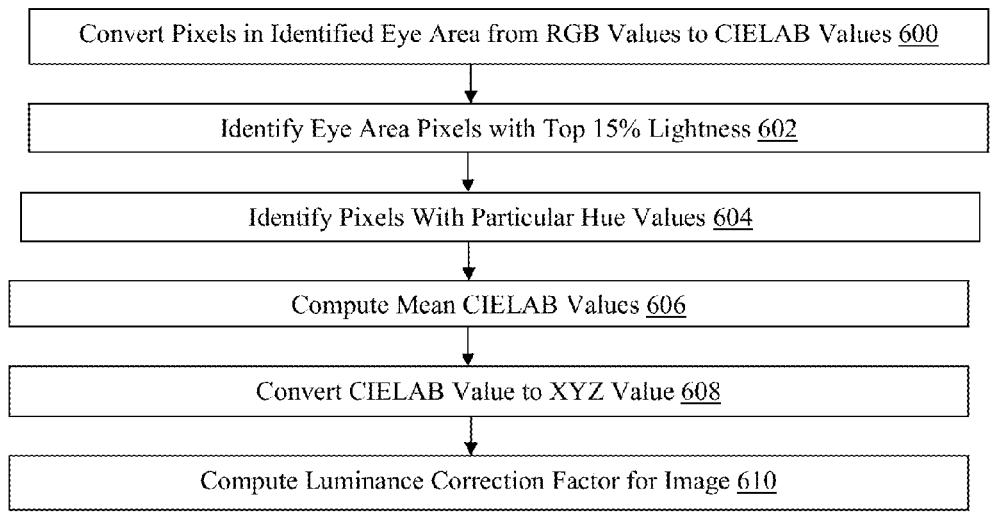
FIG. 6 is a flowchart of an exemplary method of determining a white point in an eye area.

Referring back to FIG. 3, in step 312, the color correction computing device 12 analyzes the identified eye area in the obtained image to determine an eye white point (the color coordinates of the white area of the eye), although the color correction computing device 12 may analyze other identified facial areas to determine different types of features. The color coordinates of the white area of the eye photographed under soft daylight would not vary appreciably from one person to the other under normal circumstances, and can be assumed constant. FIG. 6 illustrates an exemplary process for identifying the eye white point.

As shown in FIG. 6, in step 600, the color correction computing device 12 converts the raw image data (input RGB) for each pixel in the identified eye area to CIELAB lightness, chroma, and hue values using known image processing techniques. In step 602, the color correction computing device 12 identifies eye area pixels within the 15% of the maximum lightness value, although other pixels may be identified based on different criteria. Next in step 404, for each pixel meeting the lightness criterion (i.e., within 15% of the maximum value), the color correction computing device 12 identifies the pixels with hue values that do not fall within a predetermined percentage (x) of the maximum or minimum values, and are within a predetermined percentage (y) of the mean value. In this example, x=10% and y=40%, although other percentage values may be used.

In step 606, for each pixel satisfying the lightness and hue criteria, the color correction computing device 12 computes the mean CIELAB values for lightness, chroma, and hue, although the color correction computing device 12 may compute other values. In step 408, the color correction computing device 12 utilizes the mean CIELAB values to compute CIEXYZ using known conversion methods between the two color spaces based on a destination white point. In this example, the values are converted using D65 (daylight at 6500K) as the destination white point, although other calculations may be performed using other white point values. These CIELAB and CIEXYZ values correspond to the mean eye white point. In step 408, the color correction computing device 12 then computes a luminance correction factor for the image. In this example, the luminance correction factor is computed as the mean eye white point luminance divided by 0.5. The denominator is a heuristic value of 0.5 and other values may be used. The luminance factor may be used to correct for lighting conditions. Although an exemplary method for determining the eye white point and the luminance correction factor have been described, it is to be understood that other methods may be used to compute these values.

Figure 7:
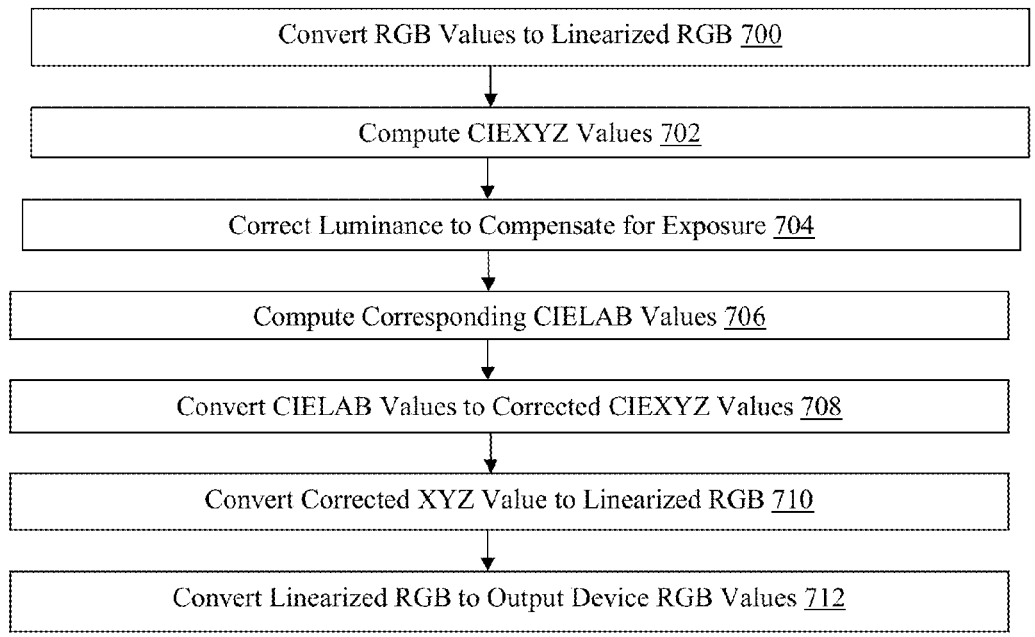
FIG. 7 is a flowchart of an exemplary method of computing corrected colorimetric data.

Referring back to FIG. 3, in step 314, the color correction computing device 12 provides color correction for individual pixels in the identified AOI. An exemplary flowchart for the color correction process for individual pixels in the AOI is illustrated in FIG. 7.

In step 700, the color correction computing device 12 converts the raw digital values of individual pixels into linearized RGB values using known camera characteristics. Alternatively, when camera characteristics are not known, generic values can be used in the color correction method. In step 702, the color correction computing device 12 computes CIEXYZ values using the linearized RGB values and the camera primary tristimulus matrix using known conversion techniques. In step 704, the color correction computing device 12 applies a luminance correction factor to the CIE Y (luminance) values to compensate for the camera exposure. In this example, the luminance correction factor is computed as the mean eye white point luminance divided by 0.5. The denominator is a heuristic value of 0.5 and other values may be used. The luminance factor may be used to correct for lighting conditions.

Next, in step 706, the color correction computing device 12 uses the luminance-corrected CIEXYZ values and the eye white point, which was determined as illustrated in FIG. 6, to compute corresponding CIELAB values using known conversion methods between the two color spaces. In step 708, the color correction computing device 12 uses the computed CIELAB values and destination white point (D65) to compute corrected CIEXYZ values, although other methods and other destination white points may be utilized. In step 710, the color correction computing device 12 linearizes the corrected XYZ values to linearized RGB values for display on an output device, such as the display device 40 of the user computing device 14(1). In step 712, the color correction computing device 14 obtains output RGB digital values (or generic sRGB values) by applying output device (e.g. smart-phone display) characteristics, such as gamma functions, although other types of characteristics may be used. Although an exemplary method for color correcting the digital image based on the white point of the identified eye area has been described, it is to be understood that other methods may be used to compute these values.

Figure 8:
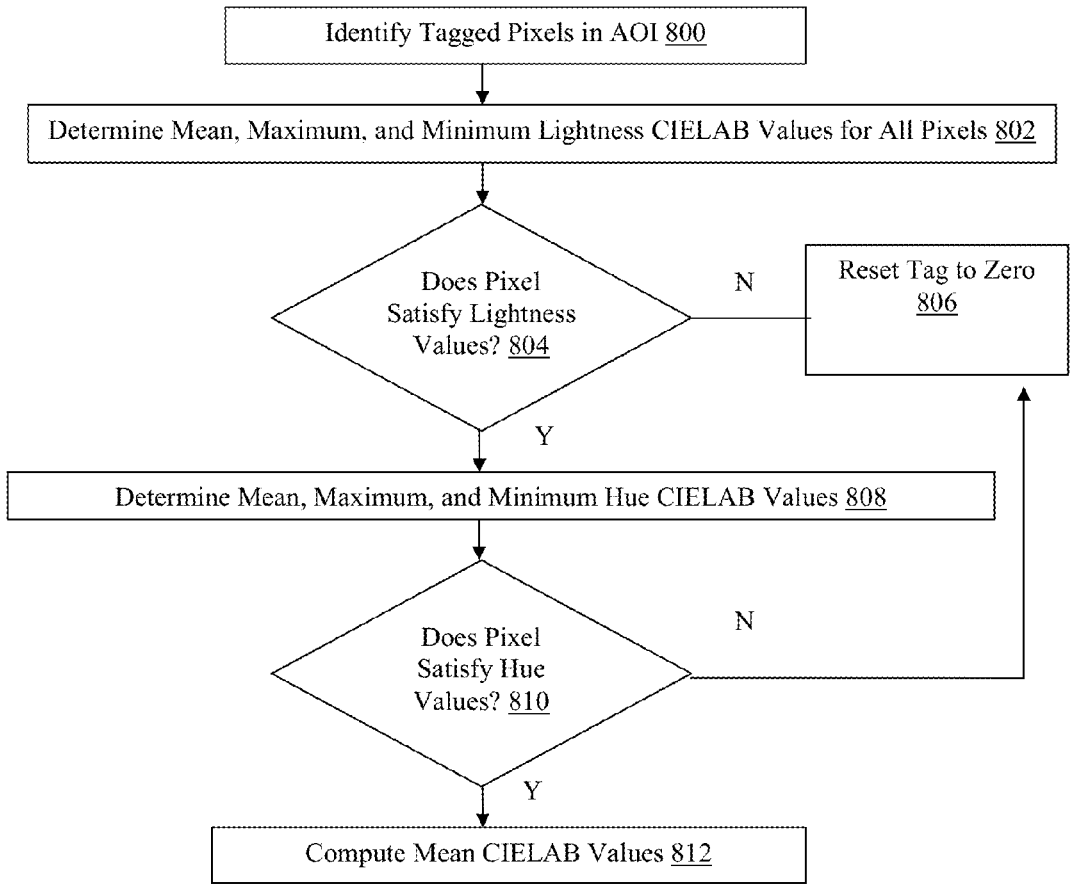
FIG. 8 is a flowchart of an exemplary method of determining dominant CIELAB values in a digital image.

Referring back to FIG. 3, the color correction computing device 12 may additionally determine or extract the dominant CIELAB lightness (L*), chroma (C*), and hue (h*) values for the identified areas, although the mobile computing device may determine other values for additional identified areas in the digital image. An exemplary flowchart for the color correction process for individual pixels in the AOI is illustrated in FIG. 8.

In step 800, the color correction computing device 12 identifies each pixel in the identified AOI that has been tagged as belonging to the one of the identified facial areas, such as by way of example only the user's hair, eyes, lips, or skin, although other pixels with other types of tags may be identified. In step 802, the color correction computing device 12 computes the mean, maximum, and minimum lightness (in CIELAB) values for pixels in each identified area, although the color correction computing device 12 may compute other values. In step 804, the color correction computing device 12 determines whether the pixel satisfies a predetermined lightness value range. The color correction computing device 12 determines whether the pixels are within a predetermined percentage (x) of the maximum or minimum values, and are within a predetermined percentage (y) of the mean value. In this example, x=10% and y=40%, although other percentage values may be used.

If in step 804, the color correction computing device 12 determines a pixel value falls outside of the predetermined ranges, the No branch is taken to step 806 where the pixel tag is reset to zero indicating the pixel does not belong to the identified facial area. In in step 804, the color correction computing device 12 determines a pixel value falls within the predetermined ranges, the Yes branch is taken to step 808 where the color correction computing device 12 computes the mean, maximum, and minimum hue (in CIELAB) values for those pixels in each identified area.

Next, in step 810, the color correction computing device 12 determines whether each of the pixels falls within predetermined ranges for hue values. The color correction computing device 12 determines whether the pixels are within a predetermined percentage (x) of the maximum or minimum values, and are within a predetermined percentage (y) of the mean value. In this example, x=10% and y=40%, although other percentage values may be used.

Figure 9:
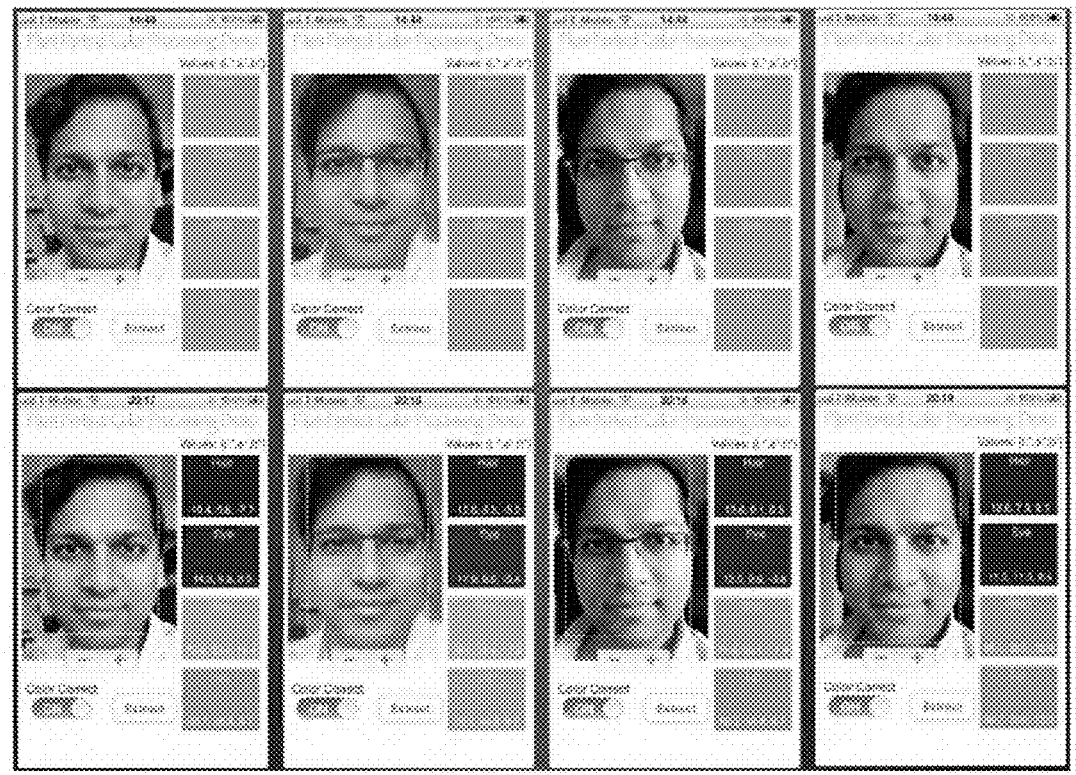
FIG. 9 is a screen shot of the results of the exemplary method illustrated in the flowchart of FIG. 8.

If in step 810, the color correction computing device 12 determines a pixel value falls outside of the predetermined ranges, the No branch is taken to step 806 where the pixel tag is reset to zero. In step 810, the color correction computing device 12 determines a pixel value falls within the predetermined ranges, the Yes branch is taken to step 812 where the color correction computing device 12 computes the computes the mean CIELAB L*, C*, and h* values. Although an exemplary method for color identifying the dominant colors of identified areas in a digital image has been described, it is to be understood that other methods may be used to identify the dominant colors. Test results from the color correction and extraction methods of this exemplary technology are illustrated in FIG. 9. The results show consistent CIELAB lightness, chroma, and hue values for the various captures shown in FIG. 9.

Referring back to FIG. 3, in step 318, the color correction computing device 12 computes an output RGB color for the hair, eyes, and lips in the digital image using the dominant L*, C*, and h* values computed in step 316 and the eye white point determined in step 312. The output RGB colors represent the true colorimetrically accurate (actual or real) color of the identified areas of the face.

Accordingly, as illustrated and described with the examples herein this technology provides a number of advantages including providing methods, non-transitory computer readable medium, and a color correction computing device for obtaining colorimetrically accurate (actual or real) colors of an object from a digital image of the object captured by a digital camera with known characteristics, but under unknown lighting and diverse background conditions.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for color correcting a digital image, the method comprising:

identifying, by a color correction computing device, an area of interest in a digital image comprising a plurality of pixels, the identified area of interest comprising one or more facial areas;

identifying, by the color correction computing device, at least a hair area and an eye area in the identified area of interest;

determining, by the color correction computing device, a refined hair area in the identified area of interest based on the identified hair area, wherein the determining the refined hair area comprises:

computing, by the color correction computing device, at least a lightness value (L) and a chroma value (C) for each pixel in the identified hair area;

determining, by the color correction computing device, a data point value (D) for each pixel in the identified hair area based on the computed lightness value and the computed chroma value;

applying, by the color correction computing device, a smoothing filter to data point value (D) for each pixel in the identified hair area to determine a smoothed data point value ($D_S$) for each pixel in the identified hair area;

calculating, by the color correction computing device, a $D_S$ mean value ($D_{S-mean}$), a $D_S$ maximum value ($D_{S-max}$), and a $D_S$ minimum value ($D_{S-min}$) for the identified hair area;

determining, by the color correction computing device, a threshold value (T) for the identified hair area based on the calculated $D_S$ mean, $D_S$ maximum, and $D_S$ minimum values; and identifying, by the color correction computing device, the refined hair area based on the determined threshold value;

determining, by the color correction computing device, a white point in the eye area of the identified area of interest;

determining, by the color correction computing device, based on the determined white point and a destination white point, one or more corrected colorimetric data points for each of the plurality of pixels in the identified area of interest; and correcting, by the color correction computing device, one or more output colors in the digital image using the determined one or more corrected colorimetric data points.

2. The method as set forth in claim 1 further comprising:

determining, by the color correction computing device, a set of dominant color values comprising lightness, chroma, and hue for the one or more identified facial areas based on the determined one or more corrected colorimetric data points;

determining, by the color correction computing device, based on the determined set of dominant color values for the one or more identified facial areas and the determined white point, a dominant output color for each of the one or more identified facial areas.

3. The method as set forth in claim 2 wherein the set of dominant color values comprise one or more of lightness, chroma, or hue.

4. The method as set forth in claim 1 wherein the digital image is received from a user computing device, the method further comprising providing, by the color correction device, a set of instructions to position a user's face at a predetermined distance relative to a camera of the user computing device prior to obtaining the digital image.

5. The method as set forth in claim 1 further comprising outputting, by the color correction computing device, the color corrected digital image for display on a user computing device.

6. The method of claim 1, wherein $D=2*L-C$.

7. The method of claim 1, wherein $T=0.9447*D_{S-mean}-0.0309*D_{S-max}+D_{S-min}$.

8. The medium of claim 1, wherein $D=2*L-C$.

9. The medium of claim 1, wherein $T=0.9447*D_{S-mean}-0.0309*D_{S-max}+D_{S-min}$.

10. The apparatus of claim 1, wherein $D=2*L-C$.

11. The apparatus of claim 1, wherein $T=0.9447*D_{S-mean}-0.0309*D_{S-max}+D_{S-min}$.

12. A non-transitory computer readable medium having stored thereon instructions for color correcting a digital image comprising machine executable code which when executed by at least one processor, causes the processor to perform steps comprising:

identifying an area of interest in a digital image comprising a plurality of pixels, the identified area of interest comprising one or more facial areas;

identifying at least a hair area and an eye area in the identified area of interest;

determining a refined hair area in the identified area of interest based on the identified hair area, wherein the determining the refined hair area comprises:

computing at least a lightness value (L) and a chroma value (C) for each pixel in the identified hair area;

determining a data point value (D) for each pixel in the identified hair area based on the computed lightness value and the computed chroma value;

applying a smoothing filter to data point value (D) for each pixel in the identified hair area to determine a smoothed data point value ($D_S$) for each pixel in the identified hair area;

calculating a $D_S$ mean value ($D_{S-mean}$), a $D_S$ maximum value ($D_{S-max}$), and a $D_S$ minimum value ($D_{S-min}$) for the identified hair area;

determining a threshold value (T) for the identified hair area based on the calculated $D_S$ mean, $D_S$ maximum, and $D_S$ minimum values; and identifying the refined hair area based on the determined threshold value;

determining a white point in the eye area of the identified area of interest;

determining, based on the determined white point and a destination white point, one or more corrected colorimetric data points for each of the plurality of pixels in the identified area of interest; and correcting one or more output colors in the digital image using the determined one or more corrected colorimetric data points.

13. The medium as set forth in claim 12 further comprising:

determining a set of dominant color values for the one or more identified facial areas based on the determined one or more corrected colorimetric data points;

determining, based on the determined set of dominant color values for the one or more identified facial areas and the determined white point, a dominant output color for each of the one or more identified facial areas.

14. The medium as set forth in claim 13 wherein the set of dominant color values comprise one or more of lightness, chroma, or hue.

15. The medium as set forth in claim 12 wherein the digital image is received from a user computing device, the medium further comprising machine executable code which when executed by at least one processor, causes the processor to perform steps comprising:

providing a set of instructions to position a user's face at a predetermined distance relative to a camera of the user computing device prior to obtaining the digital image.

16. The medium as set forth in claim 12 further comprising machine executable code which when executed by at least one processor, causes the processor to perform steps comprising outputting the color corrected digital image for display on a user computing device.

17. A color correction computing apparatus comprising a memory coupled to at least one processor which is configured to execute programmed instructions stored in the memory comprising:
  identifying an area of interest in a digital image comprising a plurality of pixels, the identified area of interest comprising one or more facial areas;
  identifying at least a hair area and an eye area in the identified area of interest;
  determining a refined hair area in the identified area of interest based on the identified hair area, wherein the determining the refined hair area comprises:
    computing at least a lightness value (L) and a chroma value (C) for each pixel in the identified hair area;
    determining a data point value (D) for each pixel in the identified hair area based on the computed lightness value and the computed chroma value;
    applying a smooting filter to data point value (D) for each pixel in the identified hair area to determine a smoothed data point value ($D_S$) for each pixel in the identified hair area;
    calculating a $D_S$ mean value ($D_{S-mean}$), $D_S$ maximum value ($D_{S-max}$), and a $D_S$ minimum value ($D_{S-min}$) for the identified hair area;
    determining a threshold value (T) for the identified hair area based on the calculated $D_S$ mean, $D_S$ maximum, and $D_S$ minimum values; and
    identifying the refined hair area based on the determined threshold value;
  determining a white point in the eye area of the identified area of interest;
  determining, based on the determined white point and a destination white point, one or more corrected colorimetric data points for each of the plurality of pixels in the identified area of interest; and
  correcting one or more output colors in the digital image using the determined one or more corrected colorimetric data points.

18. The apparatus as set forth in claim 17 wherein the processor coupled to the memory is further configured to execute programmed instructions stored in the memory further comprising:
  determining a set of dominant color values for the one or more identified facial areas based on the determined one or more corrected colorimetric data points;
  determining, based on the determined set of dominant color values for the one or more identified facial areas and the determined white point, a dominant output color for each of the one or more identified facial areas.

19. The apparatus as set forth in claim 18 wherein the set of dominant color values comprise one or more of lightness, chroma, or hue.

20. The apparatus of claim 17 wherein the processor coupled to the memory is further configured to execute programmed instructions stored in the memory further comprising providing instructions to position a user's face at a predetermined distance relative to a camera prior to obtaining the digital image of the face.

21. The apparatus of claim 17 wherein the processor coupled to the memory is further configured to execute programmed instructions stored in the memory further comprising outputting the color corrected digital image for display on a user computing device.

* * * * *